US006466515B1

United States Patent
Alsup et al.

(10) Patent No.: US 6,466,515 B1
(45) Date of Patent: Oct. 15, 2002

(54) POWER-EFFICIENT SONAR SYSTEM EMPLOYING A WAVEFORM AND PROCESSING METHOD FOR IMPROVED RANGE RESOLUTION AT HIGH DOPPLER SENSITIVITY

(75) Inventors: James M. Alsup, San Diego, CA (US); Harper J. Whitehouse, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/014,126

(22) Filed: Oct. 26, 2001

(51) Int. Cl.[7] ............................................. G01S 15/04
(52) U.S. Cl. ....................................... 367/101; 367/99
(58) Field of Search ........................... 367/94, 99, 101, 367/137, 901; 375/354

(56) References Cited

U.S. PATENT DOCUMENTS 6,349,073 B1 * 2/2002 Alsup ......................... 367/101

OTHER PUBLICATIONS

"Geometric Comb Waveforms for Reverberation Suppression", Henry Cox and Hung Lai, Orincon Corp., 1058–6393/95, 1995 IEEE.
"Doppler–Sensitive Active Sonar Pulse Designs for Reverberation Processing", T. Collins and P. Atkins, IEE Proc–Radar, Sonar Navig. vol. 145, No. 6, Dec. 1998.

"Comb Waveforms For Sonar", James M. Alsup, Thirty–Third Asilomar Conference on Signals, Systems, & Computers, Oct. 24–27, 1999 Published Dec. 1999.

"Hermite Functions and Regularized Deconvolution in Sonar Waveform Design and Processing", James M. Alsup and Harper J. Whitehouse, Oct. 29 –Nov. 1, 2000.

* cited by examiner

*Primary Examiner*—Ian J. Lobo
(74) *Attorney, Agent, or Firm*—James A. Ward; Peter A. Lipovsky; Celia C. Dunham

(57) ABSTRACT

A sonar system that includes a new comb-like waveform constructed by modulating the tines of a comb spectrum according to a set of Hermite functions defining a Hermite Function Space (HFS), and a processing method that reduces the sidelobes of the ambiguity function associated with the normally-processed HFS comb waveform. Noise-limited performance remains high, because the waveform is designed to be power-efficient; range ambiguity is superior to the highly-rated sinusoidal frequency-modulation (SFM) waveform; and reverberation-limited performance is equal to or better than that offered by any other waveform designed for this purpose. The full Doppler sensitivity normally associated with pulsed CW can be realized by the application to HFS signals of the constrained, regularized deconvolution method of this invention. The deconvolutionally-processed Hermite-function comb waveform offers better reverberation-limited performance than does the triplet-pair comb waveform or any of its predecessors, while maintaining a noise-limited performance equal to the best of these.

8 Claims, 9 Drawing Sheets

POWER-EFFICIENT SONAR SYSTEM EMPLOYING A WAVEFORM AND PROCESSING METHOD FOR IMPROVED RANGE RESOLUTION AT HIGH DOPPLER SENSITIVITY

FEDERALLY-SPONSORED RESEARCH AND DEVELOPMENT

The present invention is assigned to the United States Government and is available for licencing for commercial purposes. Licensing and technical inquiries should be directed to the Office of Patent Counsel, Space and Naval Warfare Systems Center, San Diego, Code D0012, San Diego, Calif., 92152; telephone (619)553-3001, facsimile (619)553-3821.

BACKGROUND OF THE INVENTION

1. Field of the Invention

This invention relates generally to active sonar systems and more particularly to methods for optimizing noise-limaited and reverberation-limited target detection in littoral regions.

2. Description of the Prior Art

A major problem for sonar systems operating in shallow water is reverberation from the ocean bottom. With expanding Navy operation in littoral regions, the shallow-water reverberation. problem has received much recent attention from practitioners in the art. In 1995, Henry Cox et al. ("Geometric Comb Waveformns for Reverberation Suppression," *Proceedings, Twenty-Ninth Asilomar Conference on Signals, Systems, and Computers,* Pacific Grove, Calif., Oct. 29–Nov. 1, 1995, pp. 1185–1189) proposed a class of geometric comb waveformns that offer high range resolution and, excellent Doppler properties for active sonar detection of moving targets in reverberation. In 1999, James Alsup ("Comb Waveforms for Sonar," *Proceedings, Thirty-Third Asilomar Conference on Signals, Systems and Computers,* Pacific Grove, Calif., Oct. 24–27, 1999, pp. 864–869) introduced the "triplet-pair" waveform to achieve what the geometric comb waveform did with improved power efficiency. These waveforms maintain high Doppler sensitivity by using a plurality of narrow-band spectral components, for example, continuous-wave (CW) tone pulses, whose frequencies are placed so as to be almost, but not quite, equally-spaced within the system bandwidth.

Collins et al. ("Doppler-Sensitive Active Sonar Pulse Designs for Reverberation Processing," *IEEE Proc.-Radar, Sonar Navig.,* Vol. 145, No. 6, December 1998, pp. 347–353) later compared the theoretical and experimental performance of several reverberation-insensitive active sonar waveforms. Collins et al. showed that the hyperbolic frequency-modulated (HFM) waveform is advantageous for low Doppler targets at long ranges, because the system is usually noise-limited at long ranges, and that the sinusoidally frequency-modulated (SFM) pulse waveform is preferred for suppressing reverberation effects, which occur primarily at short to medium ranges. But they also noted that the Cox comb waveform eliminate much of the range-ambiguity of the SFM system while still exhibiting a similar Doppler ambiguity.

Some littoral regions have negligible reverberation and detection capability is accordingly ambient-noise limited over some portion of the nominal detection range of an active sonar system. This may occur in slightly deeper water at close range or in shallow water at longer range. Because active sonar transmitters suitable for littoral operation are normally power- and duty-cycle-limited, there is a need for transmit waveforms with a dynamic range designed to make use of as much available power as possible. Collins et al. suggest that the SFM waveform is preferred over the Cox comb waveform despite its superior range-ambiguity properties because of the improved noise-limited performance of the higher average transmitter power available from SFM. Alsup showed that the triplet-pair waveform has both the noise-limited performance of SFM and the superior range-ambiguity properties of the geometric comb, and thus (of these three) would be most preferred.

There are also many signal waveforms known in the art that offer a "thumbtack" type of ambiguity function (AF), the advantages of which may be appreciated with reference to C. E. Cook et al (*Radar Signals, an Introduction to Theory and Practice,* Academic Press, New York, 1967) or A. W. Rihaczek (*Principles of High-Resolution Radar,* McGraw-Hill, New York, 1969). These signals include, for example, pseudo-random noise (PRN) sequences, frequency-hop (FHOP) codes (spread-spectrum), and rooftop-FM signals. However, such signals do not provide adequate Doppler-ambiguity properties generally because of the integrated behavior of the sidelobes or the lack of sufficient chip-length.

There is accordingly still a clearly-felt need in the art for an active sonar system that provides improved performance in noise-limited littoral regions without sacrificing sensitivity to low-Doppler targets in reverberation-limited environments. These unresolved problems and deficiencies are clearly felt in the art and are solved by this invention in the manner described below.

SUMMARY OF THE INVENTION

The system of this invention includes a new comb-like waveform constructed by modulating the tines of the comb according to a set of Hermite functions, and an improved processing method that reduces the sidelobes of the ambiguity function associated with the normally-processed comb-like waveform. Ambient noise-limited performance remains high, because the waveform is designed to be power-efficient; range ambiguity is superior to the highly-rated sinusoidal frequency-modulated (SFM) waveform; and reverberation-limited performance is equal to or better than that offered by any other waveform designed for this purpose, such as, for example, the geometric comb or triplet-pair comb waveforms.

It is a purpose of this invention to provide an active sonar system with optimum or near-optimum noise-limited performance in littoral regions, which normally occurs at longer ranges. It is another purpose of this invention to provide an active sonar system with optimum or near-optimum reverberation-limited performance in littoral regions, which normally occurs at short-to-medium range.

In one aspect, the invention is an acoustic detection method including the steps of transmitting an acoustic signal employing a Hermite function space (HFS) comb waveform to ensonify a target area, detecting acoustic reflections from the target area at a receiver transducer, generating a transducer output signal representing the acoustic reflections, and processing the transducer output signal to determine range and Doppler values for the target area.

In another aspect, the invention is an acoustic detection apparatus comprising an acoustic transmitter for transmitting an acoustic signal to ensonify a target area, wherein the acoustic signal includes a Hermite-function space (HFS)

comb waveform, a receiver transducer array for detecting acoustic reflections from the target area, a circuit for generating a transducer array output signal representing the acoustic reflections, and a new type of signal processor for processing the transducer array output signals (including beamforming) to determine range, bearing and Doppler values for the target area.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

DESCRIPTION OF THE PREFERRED EMBODIMENT

Figure 1:
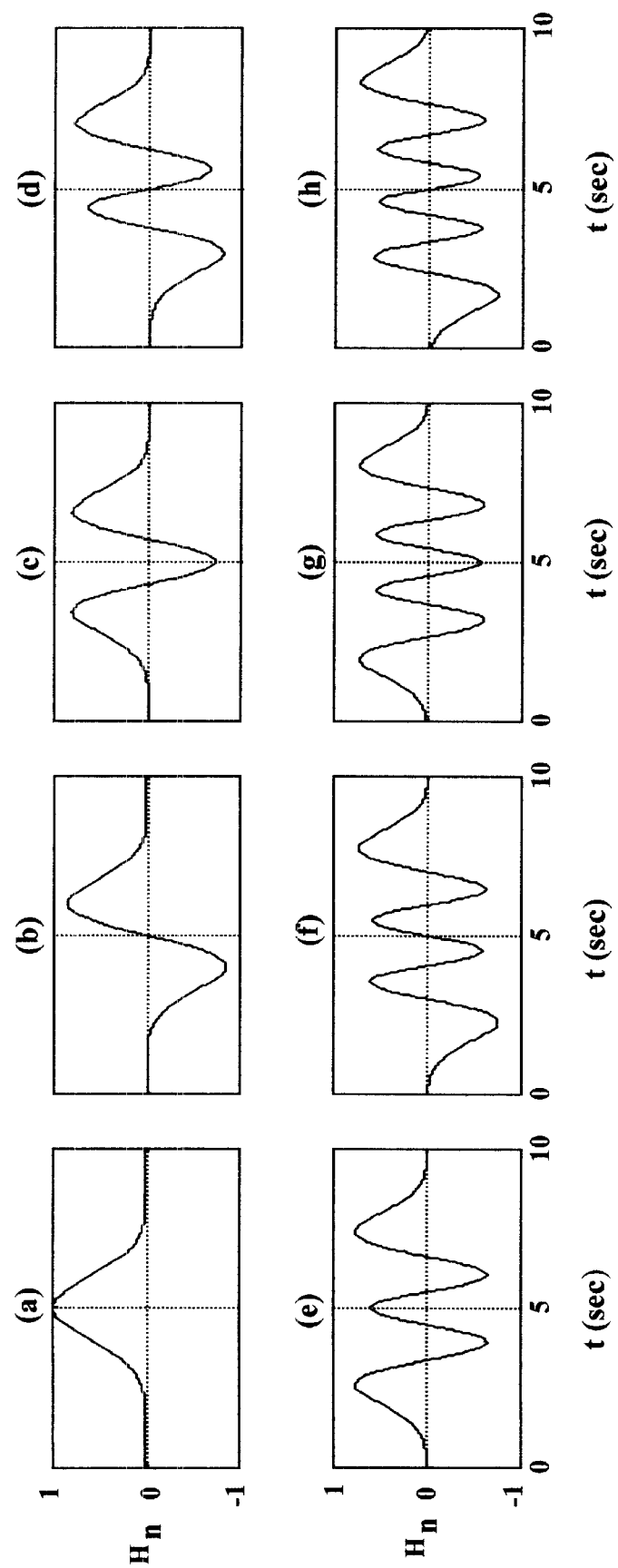
FIGS. 1(a)–(h) illustrate exemplary representations of a set of Hermite-functions from the prior art.

The system of this invention using the Hermite function space (HFS) waveform and the associated special processing techniques described below is particularly well-adapted for use in an active sonar detection system for littoral regions at frequencies of 100–1000 Hz but is not limited thereto and may be used over lesser or greater bandwidths, and at higher or lower center frequencies as desired. In littoral waters, relative to deeper ocean regions, the shallow depths may result in a substantial decrease in passive-sonar target detection range and a concomitant substantial increase in active-sonar reverberation levels from sea-floor scattering.

This application is related by subject matter to the commonly-assigned patent application Ser. No. 09/745,610 entitled "A Sonar System And Method Employing a Power-Efficient Triplet-Pair Comb Waveform," which is entirely incorporated herein by reference.

Active target detection in many littoral environments is ambient-noise limited over some part of the nominal detection range of an active sonar system, usually at longer ranges, because of negligible reverberation levels. For these situations, power-efficient waveforms are important for maintaining or improving detection performance. Because sonar projectors operating in the 100–1000 Hz acoustic spectrum are usually peak-power-limited, effective noise-limited operation requires the use of as much available transmitter power as possible. In these situations, waveform gain can be expressed as follows:

$$WG_{AN} = PG + PF \qquad \text{[Eqn. 1]}$$

$$PG = 10*\log(T*W) \qquad \text{[Eqn. 2]}$$

$$PF = 20*\log(\varsigma) \qquad \text{[Eqn. 3]}$$

where:

$WG_{AN}$=waveform gain in ambient noise in dB;

PG=processing gain in dB;

PF=power factor dB;

T=waveform duration in seconds;

W=waveform bandwidth in radians/sec;

$\varsigma$=waveform efficiency; the ratio of the power radiated by the subject waveform to the power radiated by a uniformly-weighted single-frequency tone ping at the center of the frequency band of the subject waveform.

Active target detection in the same or other littoral environments is reverberation-limited (where the reverberation level is higher than the ambient-noise level) over some part of the nominal detection range of an active sonar system. This condition usually exists for close to intermediate target ranges in shallow water. Reverberation is likely to be dominated by reflections from bottom-scatterers, which have an intrinsic Doppler of zero. The observed Doppler is generally narrowly-distributed about zero Doppler, which maybe and commonly is visualized as a ridge-centered at zero Doppler on a range & Doppler vs. received energy contour diagram. The Q-function (see G. W. Deley, "Chapter 3: Waveform Design," *Radar Handbook*, M. I. Skolnik, editor, McGraw-Hill, New York, 1980), which is defined as the one-dimensional integral of the waveform ambiguity function across range, illuminates the extent to which the zero-Doppler ridge may mask the target echo. The Q-function is known to express reverberation suppressability versus target Doppler.

Waveform power efficiency is not an issue in reverberation-limited operating regions because processed echo-to-reverberation ratios are nominally independent of the transmitter power level. But the system range-resolution is reflected in the vertical offset of the Q-function and system Doppler resolution is reflected in the slope of the Q-function in the zero-Doppler region. For any signal waveform, the Q-function amplitude is reduced by 10*log (W), where W is the effective signal bandwidth. For comb waveforms, W is proportional to the filled portion of the spectrum, which is generally much less than the spectral span of the comb component frequencies. The Q-function slope near zero-Doppler is steeper for comb waveforms than for Doppler-insensitive waveforms (HFM, LFM, PN, etc.). This slope is also steeper as the duration T of the comb component(s) is longer. Generally speaking, comb waveforms, such as CW's, SFM's, Cox, Newhall, TP, and HFS, will have better Doppler resolution in proportion to T, the waveform duration. However, for example, when the comb component duration is reduced to $T_C=2*T/(M+1)$ as it is for the M spectral components of a FHOP comb waveform, the Q-function slope is reduced drastically with respect to the same slope for these other comb waveforms (for which $T_C=T$).

The ambiguity function (see, for example, A. W. Rihaczek, *Principles of High-Resolution Radar,* McGraw-Hill, New York, 1969) is a well-known tool for examining the range and Doppler resolution properties of active sonar waveforms. As is well-known (see, for example, C. E. Cook & M. Bernfeld, *Radar Signals, an Introduction to Theory and Practice,* Academic Press, New York, 1967), the ambiguity function is a three-dimensional representation of the point-target response of the sonar waveform as a function of range and Doppler. Resolution granularity is important for both range and Doppler. Good range resolution reduces signal-to-reverberation ratio (SRR) by reducing the aggregate size (effective cross-sectional area) of the scatterers seen by the sonar receiver when processing returns for a particular beam/range/Doppler bin. To improve range resolution over that available from the CW-Hanning tone ping, the spectral-component spacings in comb waveforms should have unequal spacing or width. Good Doppler resolution improves signal-to-reverberation ratio (SRR) by rejecting reverberation-interference energy at all Doppler values other than the target Doppler bin. During reverberation-limited operation, the detection of target echos at low Doppler values can be improved by using comb waveforms having the best Doppler resolution; that is, those where the comb spectral component duration, $T_C$, is equal to the waveform transmission duration, T.

Table 1 presents a representative but incomplete list ofuseful active sonar system waveforms and identifies the qualitative standings of the respective Doppler resolution, range resolution and power efficiency characteristics. Table 1 is organized into Doppler-sensitive (comb waveform) and Doppler-insensitive categories. The geometric comb (Cox) waveform is important in the art because of its apparent high Doppler sensitivity at moderately good range resolution. This waveform exhibits poor power efficiency, however. The Exponential Residue Codes waveform can be appreciated with reference to J. Alsup, Exponential Residue Codes, *IEEE Transactions on Aerospace and Electronic Systems,* November 1975, pp. 1389–90.

TABLE 1

| Waveform | Resolution | | Power Efficiency |
|---|---|---|---|
| | Range | Doppler | |
| Doppler Insensitive | | | |
| Linear Frequency Modulation (LFM) | high | low | high |
| Hyperbolic Frequency Modulation (HFM) | high | low | high |
| Rooftop (HFM or LFM) | high | low | high |
| Golay Complementary Pairs | high | low | high |
| Pseudo-Random Noise (PRN) | high | low | high |
| Exponential Residue Codes | high | low | high |

TABLE 1-continued

| Waveform | Resolution | | Power Efficiency |
|---|---|---|---|
| | Range | Doppler | |
| Doppler Sensitive | | | |
| Single-Frequency Pulse (CW) | low | high | medium |
| FHOP Comb | medium | low | high |
| Newhall Comb (LFM, HFM) | low | high | medium |
| Sinusoidal Frequency-Modulation (SFM) | low | high | medium |
| Cox Geometric Comb | medium | high | low |
| Triplet-Pair Comb | medium | high | medium |
| Hermite Function Space Comb | medium | high | medium |

The HFS comb waveform and the associated special processing techniques described herein below, for the first time offers superior Doppler sensitivity over other comb-like waveforms, while maintaining all the advantages of the triplet-pair waveform, including good power-efficiency, improved range resolution (relative to a Hanning-weighted CW pulse), and superior range-ambiguity performance.

To assist in appreciating the exemplary construction, processing and performance of the HFS waveform, reference is made to Alsup et aL (Alsup et al., "Hermite functions and regularized deconvolution in sonar waveform design and processing," 34$^{th}$ Asilomar Conference on Signals, Circuits and Systems, Oct. 29 through Nov. 3, 2000, Pacific Grove, Calif.), which is entirely incorporated herein by this reference.

The Hermite Function-space

There are many signal waveforms that have a "thumbtack" type of ambiguity function (AF), including pseudo-random noise (PRN) sequences, FHOP codes, and rooftop-FM signals. However, the performance of thumbtack waveforms is usually deficient at low-Doppler because of the integrated behavior of their sidelobes or the short chip-length. The Hermite-function-space (HFS) waveforms of this invention overcome this deficiency because of the joint properties of the Hermite functions making up the "space."

The Hermite functions $\{h_k\}$ themselves are constructed in the usual manner from the well-known Hermite polynomials $\{H_n\}$, and are also numbered 1, 2, . . . , N according to the degree of the polynomial. As is well known in the art, the Hermite polynomials may be written generally as $$H_n(x) = (n!) \sum_{m=0}^{floor(n/2)} \frac{(-1)^m (2x)^{(n-2m)}}{m!(n-2m)!} \qquad [\text{Eqn. 4}]$$

The first N=8 Hermite polynomials are written as follows:

$H_0=1$ $H_1=2x$ $H_2=4x^2-2$ $H_3=8x^3-12x$ $H_4=16x^4-48x^2+12$ $H_5=32x^5-160x^3+120x$ $H_6=64x^6-480x^4+720x^2-120$ $H_7=128x^7-1344x^5+3360x^3-1680x$

The Hermite functions $\{h_k\}$ are derived from Hermite polynomials in the usual manner. For details, reference is made to Klauder (J. R. Klauder,"The Design of Radar Signals Having Both High Range Resolution and High Velocity Resolution," BSTJ, July 1960, pp. 809–820). For k=1, 2, 3, . . . , N:

$$h_k = C_{k-1}\left(\frac{1}{\sqrt{T}}\right)H_{k-1}(x)e^{-\pi\left(\frac{t}{T}\right)^2} \quad [\text{Eqn. 5}]$$

where $$x = t\sqrt{\frac{2\pi}{T}}, \quad C_k = \frac{2}{\sqrt{k!2^k}},$$

t=time (seconds), and T=pulse period (seconds).

The group $\{h_k\}$ of the first N Hermite functions is defined herein as a Hermite function space (HFS) of order N. For additional background and detail, reference is made to F. Hlawatsch, *Time-Frequency Analysis and Synthesis of Linear Signal Spaces,* Kluwer Academic Pub., Norwell, Mass., 1998. The variable x from Eqn. 4 is proportional to the time variable t in seconds. MATLAB® (by The MathWorks, Natick, Mass.) is a well-known conmmercial software product that provides a convenient mechanism for computing Hermite polynomials as a function of n and x through its Extended Symbolic Math Toolbox feature. An exemplary set of N=8 Hermite functions making up an HFS of order 8 in accordance with this invention is shown in FIGS. 1(a)–(h), ordered by increasing value of k from 1 to 8. The variable t has units of time arbitrarily scaled according to the value of pulse period T (=5 in FIG. 1) selected for the example. To create the FIG. 1 example, t was stepped from –12 to +12 in steps of ⅛ and the value of the $k^{th}$ Hermite function $h_k$ was computed and plotted as the Y-coordinate.

The HFS Comb Waveform of this Invention

The individual Hermite functions $\{h_k\}$ have the same limitation on total volume under the AF surface as the other thumbtack waveforms mentioned above. However, the volume under the AF surface of the HFS waveform can be significantly smaller, resulting in lower overall AF sidelobes. See also the above-cited Hlawatsch reference.

Figure 2:
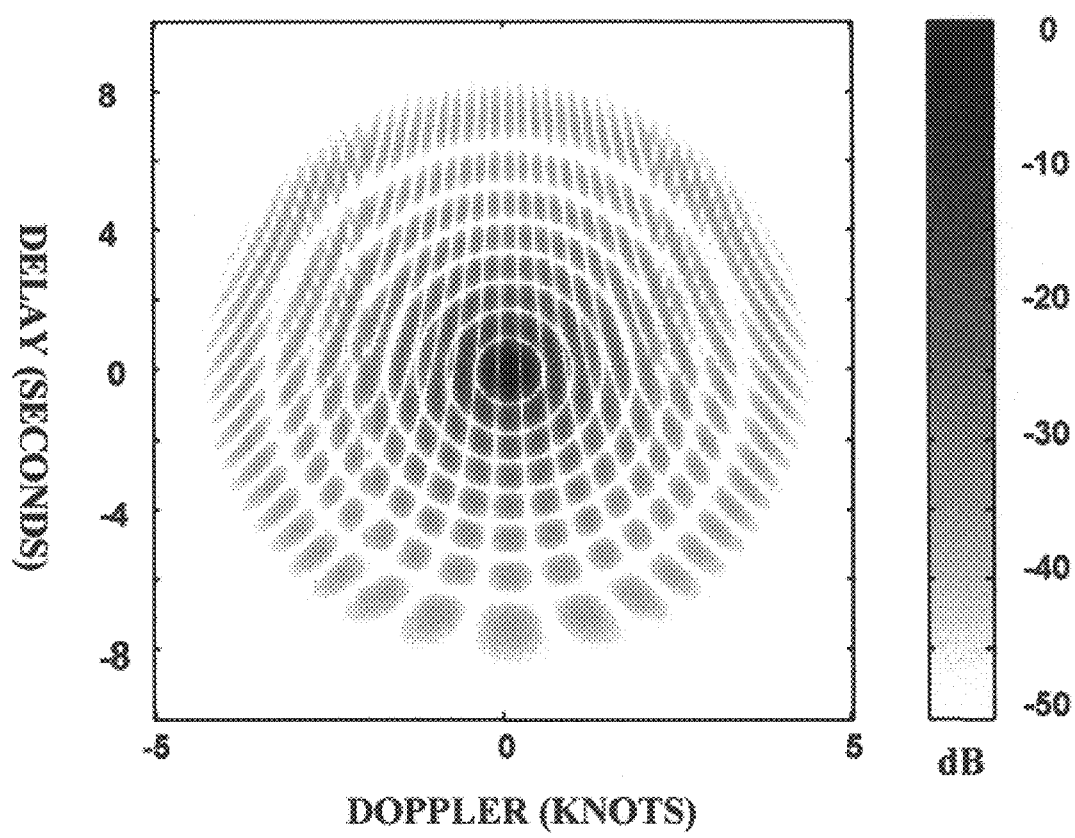
FIG. 2 shows a representation of the ambiguity function (AF) of the Hermite function space (HFS) waveform of this invention for which the receive processing is from the prior art.
Figure 3:
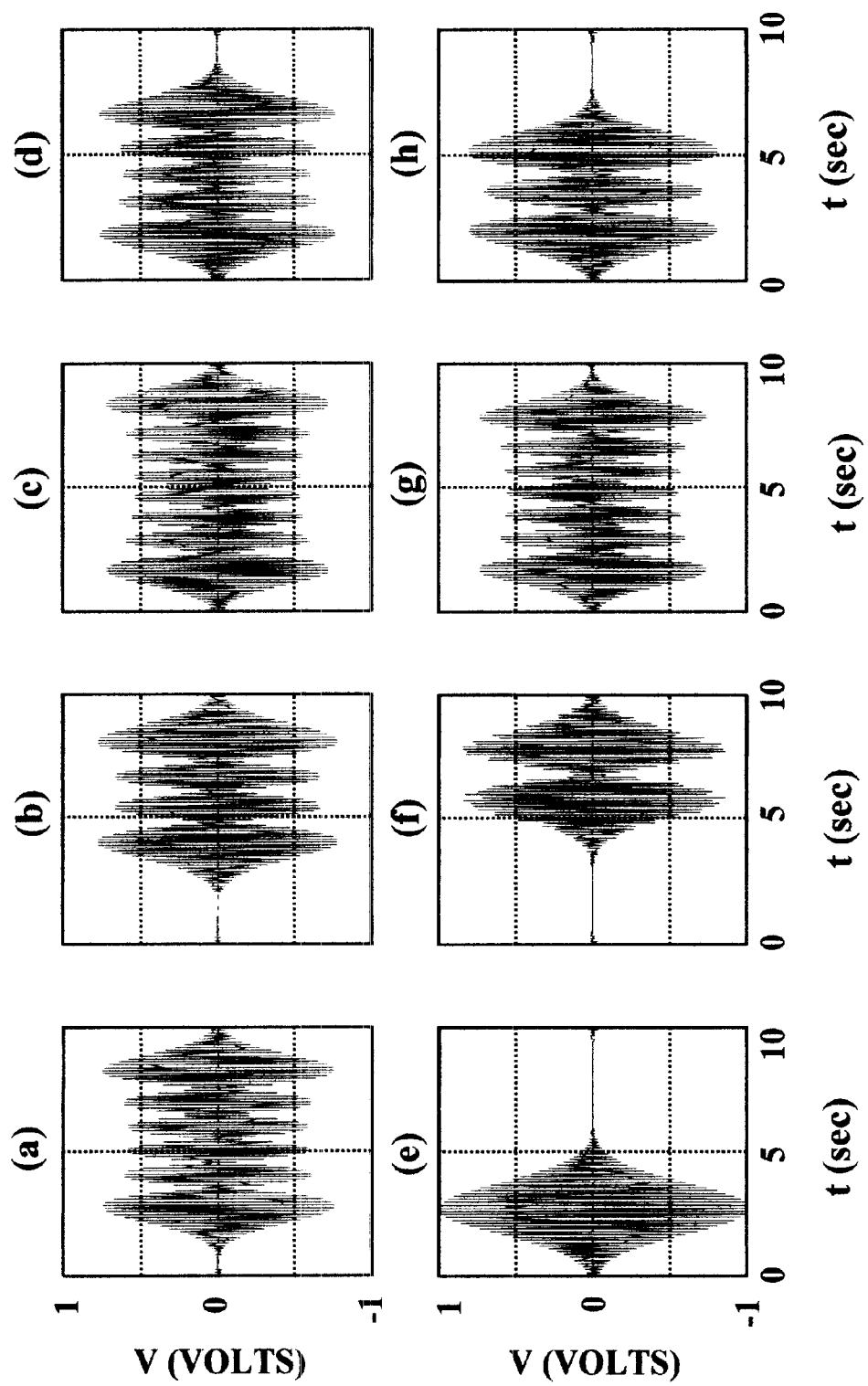
FIGS. 3 (a)–(h) show a graphical representation in the time domain of the individual Hermite-function sub-waveforms, using order-scrambling and time-shifting to optimize overall waveform power efficiency in accordance with this invention.

The associated HFS AF is shown in FIG. 2, for the case of a pulse length of 10 seconds and center frequency of 500 Hz. The primary autocorrelation sidelobe is 18 dB down from the peak, and the entire AF has the circular symmetry of a true thumbtack waveform. The representation in FIG. 2 illustrates the AF of the set of Hermite functions $\{h_k\}$ for which the waveform has not been specifically designed according to this invention.

Figure 4:
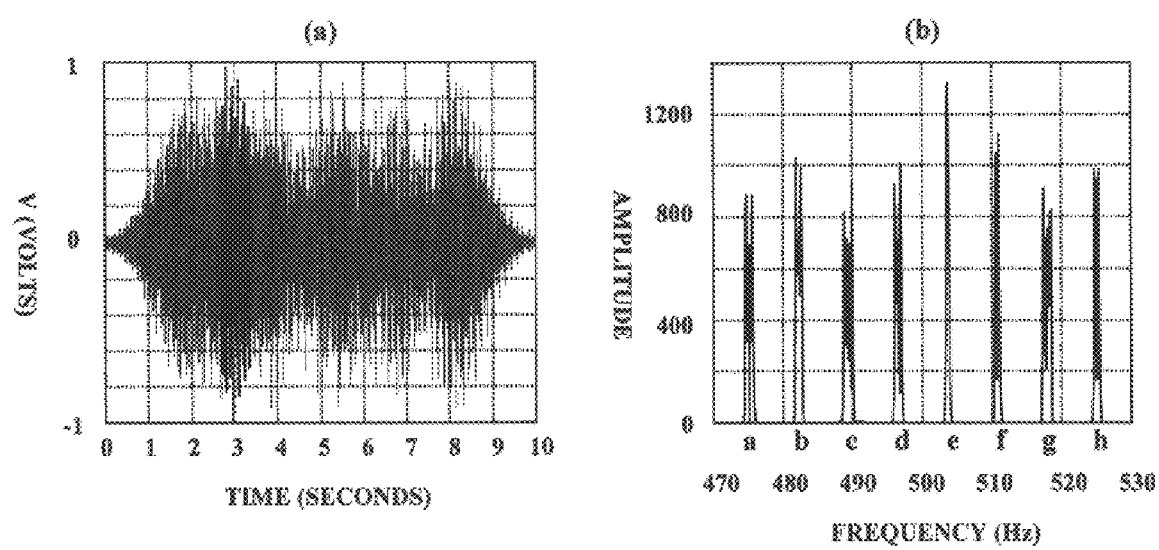
FIGS. 4 (a)–(b) show the time-domain and frequency-domain view of the resulting HFS waveform from FIGS. 3(a)–(h), demonstrating the general efficiency (a) and the comb-like structure (b)

According to the method of this invention, the HFS waveform is implemented by multiplying each of the N Hermite functions $h_k$ by a different single-frequency pulse in the time domain such that the N modulated pulse frequencies define a "comb" in the frequency domain near the center frequency of the sonar system projector. An example of such a function-space of carrier-multiplied Hermite functions is shown in FIGS. 3(a)–(h). The associated HFS comb waveform is formed by summing all N=8 components from FIGS. 3(a)–(h). FIG. 4(a) depicts the HFS comb waveform pulse in the time domain, which represents a specific summation strategy of this invention, in which the order and delay of the individual components from FIG. 3(a)–(h) is chosen to maximize the HFS comb waveform "power efficiency" in the manner discussed below. FIG. 4(b) depicts the HFS comb waveform spectrum in the frequency domain.

The FIG. 4(a) waveform represents a preferred summation strategy, in which the order and delay of the individual components in FIGS. 3(a)–(h) is chosen to maximize the waveform "power efficiency." The waveforms in FIGS. 3(a)–(h) are the scrambled, time-shifted Hermite functions on carriers for pulse period T=10, center frequency $f_c$=500 Hz and bandwidth W=50 Hz. The carriers thus modulated are shown if FIG. 4(b) in the frequency domain as A, B, C, D, E, F, G, and H. Thus, in FIG. 4(b), the order of the Hermite functions $\{h_k\}$ (now on carriers) has been scrambled relative to the frequency-order of the carriers so that $h_1$ in FIG. 3(a) modulates the carrier F in FIG. 4(b), for example. Similarly, $h_2$ in FIG. 3(b) modulates the carrier D, $h_3$ in FIG. 3(c) modulates the carrier H, $h_4$ in FIG. 3(d) modulates the carrier E, $h_5$ in FIG. 3(e) modulates the carrier A, $h_6$ in FIG. 3(f) modulates the carrier B, $h_7$ in FIG. 3(g) modulates the carrier G, and $h_8$ in FIG. 3(h) modulates the carrier C in FIG. 4(b). Also note that the position of the modulated pulse within the overall signal window [0, 10] has been shifted separately in the time domain for each of the eight pulse components in FIG. 3(a)–(h). Only component $h_8$ in FIG. 3(c) on carrier C cannot be shifted because it is the longest of the eight pulses and defines the overall length of the waveform in FIG. 4(a). The other pulse components in FIGS. 3(a)–(h) can be shifted by amounts less than or equal to the difference between the length of component $h_8$ and the particular individual component length. This is the "scrambled" and "time-shifted" quality of the waveform of this invention. This scrambling and selective delaying is preferred because it achieves greater power efficiency for the composite waveform shown in FIG. 4(a) than otherwise can be obtained. The specific frequency order and set of time shift values shown here were discovered by the inventor through experimentation. The processing that occurs at the receiver may be pre-programmed to accommodate the frequency-ordering and time-shifts incorporated in the composite pulse of this invention and to compensate accordingly so as to preserve the AF properties of the HFS waveform.

Referring to the above-cited Cox and Alsup references, it has been shown that the total system bandwidth W limits the frequency separation DF between carriers to W/(N−1), where N is the order of the space, and that this in turn leads to fundamental ambiguities (images of the main peak) in the AF associated generally with comb waveforms. These ambiguities occur at Doppler shifts proportional to DF. In the example above, where W=50 Hz and DF=7.14 Hz, the corresponding target speed at which AF ambiguities begin to appear is 20.7 knots.

HFS Waveform Processing Using Standard Methods

Figure 5:
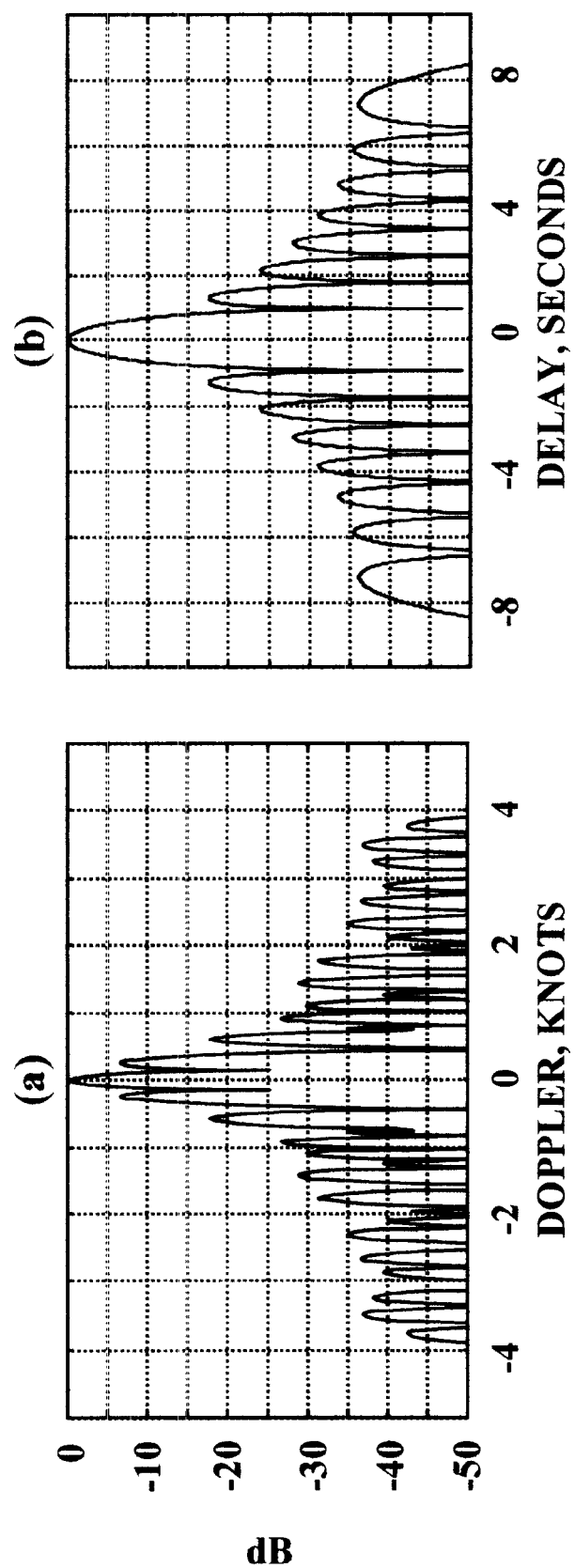
FIGS. 5(a)–(b) show a pair of graphical representations of one-dimensional (1D) slices of the conventionally-processed AF of the exemplary HFS waveform from FIGS. 4(a)–(b)

In processing a received echo from a transmitted HFS comb pulse, each fimction $\{h_k\}$ must be processed separately before summing the separate AF's to realize the benefits of the joint properties of the HFS AF. In practice, this means that the received signal must be translated to baseband N=8 separate times, once for each carrier frequency, and these translated signals must each be low-pass filtered by a filter whose band extends ±DF/2 on either side of zero Hz. Thus, for the example above, any target whose Doppler speed (projection of actual speed in the direction of the bisector between source and receiver directions) is less than 10.3 knots (half the above separation between ambiguities) may be truly represented within the band of the low-pass filter, while targets with a higher speed will be ambiguously" represented. There will be some differential Doppler dilation across carriers of the Hermite function "envelopes", but this differential dilation is negligible because of the very low bandwidth of these envelopes. FIG. 2 illustrates the AF of the HFS waveform of this invention processed using standard methods from the prior art. FIG. 5 shows examples of the central Doppler and Delay slices of the Hermite function-space AF (FIG. 2) associated with this kind of standard processing.

HFS Waveform Processing Using Constrained, Regularized Deconvolution

Although the AF sidelobes shown in FIGS. 2 and 5 appear to be well-behaved, they can still limit the low-Doppler sensitivity of this kind of waveform. Therefore, it is desirable to reduce these AF sidelobes even further. One way to do this is to perform a two-dimensional deconvolution of the AF, in such a way as to prevent an increase in sensitivity to system noise or unknown calibration factors. Reference is made to Abbiss et al., "Fast Regularized Deconvolution if Optics and Radar," *Mathematics in Signal Processing III*, ed. J. McWhirter, Clarendon Press, Oxford, 1994, pp. 421–445. An approximate method for computing the enhanced AF is now described.

For the purposes of this description, assume that the AF has been formed for a given beam of the receiver's output, and that it can be represented by the matrix U (M×N), containing AF levels for M delay values and N Doppler channels. Furthermore, assume that this AF remains unchanged if the target Doppler or range is non-zero, except to be displaced in either or both of those coordinates by the amount of Doppler and/or range associated with the target.

Figure 6:
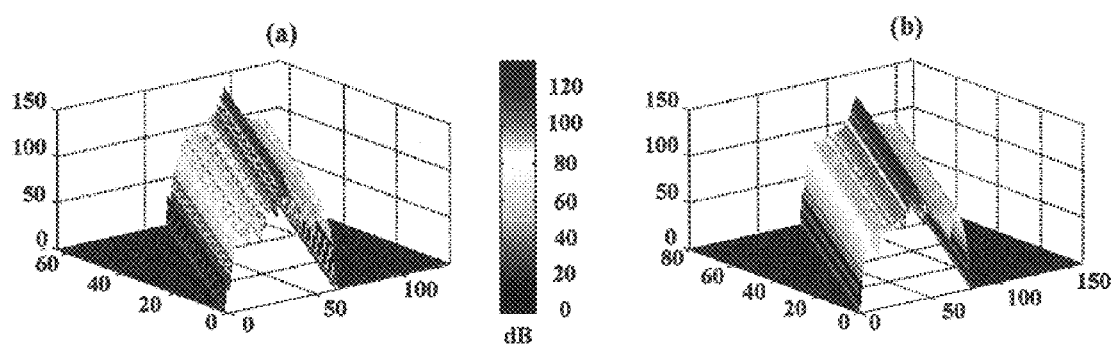
FIGS. 6(a)–(b) show graphical representations of a pair of 1D-slice manifolds associated with the exemplary HFS waveform from FIGS. 4(a)–(b)

A matrix A of size 2M×M may be formed that consists of translated versions of the aperiodic zero-Doppler Delay slice of the temporal AF, such that the peaks fall along a diagonal of the matrix in the fashion suggested by the surface in FIG. 6(a). Similarly, a matrix B of size 2N×N may be formed that consists of translated version of the aperiodic zero-Delay Doppler slice of the temporal AF in the manner illustrated in FIG. 6(b). Now let U be the distorted version of V, an enhanced AF, as represented by the following:

$$U_1 = A * V_1, \quad \text{[Eqn. 6]}$$

and $$U_2 = B * V_2, \quad \text{[Eqn. 7]}$$

where $V_1$ and $V_2$ are the Delay and Doppler slices of this enhanced AF, and $U_1$ and $U_2$ are the corresponding slices of the standard AF.

Each of these matrices is then inverted, resulting in matrices $A^+$ and $B^+$, using the regularized deconvolution method described by Per Christian Hansen ("Truncated Singular Value Decomposition Solutions to Discrete Ill-Posed Problems with Ill-Determined Numerical Rank," *SIAM J. Sci Stat. Computing*, Vol. 11, No. 3, pp. 503–518), Additionally, $A^+$ and $B^+$ can be modified to limit potentially unstable reduction in resolution width of Delay and Doppler peaks by appending an additional "resolution constraint matrix" $r_c$ onto A and B. The two inverted matrices are then used to operate on the original AF Doppler and Delay slices (U), respectively, to obtain approximations to the enhanced AF slices (V), shown as enhanced AF slices in FIGS. 7(a)–(b).

$$V_1 = A^+ r_c * U_1, \quad \text{[Eqn. 8]}$$

and $$V_2 = B^+ r_c * U_2, \quad \text{[Eqn. 9]}$$

Figure 7:
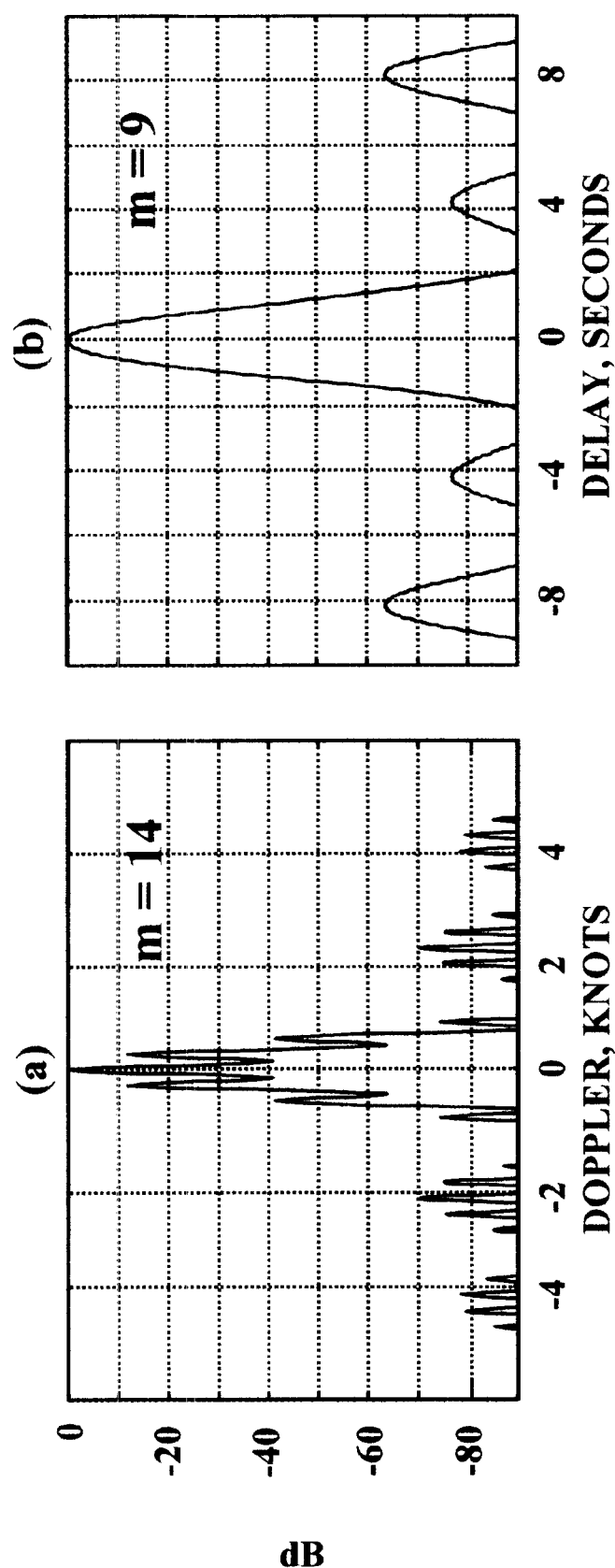
FIGS. 7(a)–(b) show graphical representations of sidelobe-reduced 1D slices associated with the conventionally-processed slices of FIGS. 5, but for which additional processing in accordance with this invention has been used to accomplish sidelobe reduction.

That is, the AF Doppler slices exemplified by the zero-Delay AF Doppler slice in FIG. 5(a) and the AF Delay slices exemplified by the zero-Doppler AF Delay slice in FIG. 5(b) may be respectively realigned as illustrated in FIGS. 6(a)–(b) to determine diagonal matrices A and B and then each such slice may be transformed by means of Eqns. 6–7 to produce an enhanced AF Doppler slice exemplified by the zero-Delay AF Doppler slice in FIG. 5(a) and an enhanced AF Delay slice exemplified by the zero-Doppler AF Delay slice in FIG. 7(b). As shown in FIGS. 7(a)–(b), the sidelobes of the AF as seen in the Doppler and Delay slices have been significantly reduced while the mainlobe characteristics have been substantially preserved, so that the whole is now relatively insensitive to system noise.

When the standard AF (U) is substantially circularly symmetric, as it is for the HFS comb waveform, a simpler procedure is available for obtaining the enhanced AF (V). The procedure exploits the symmetry by first computing several other AF slices that pass through the zero-Doppler-zero-Delay point at various angles to the Delay and Doppler axes. These slices $V_q$ are computed by taking a weighted average of the enhanced Doppler slice, $V_2$, and the enhanced Delay slice, $V_1$, in proportion to the angular distance q of the resultant slice $V_q$ from these two primary (zero-axis) slices, so that:

$$V_q = q * V_1 + (90-q) * V_2, \text{ for } 0 < q < 90 \quad \text{[Eqn. 8]}$$

Figure 8:
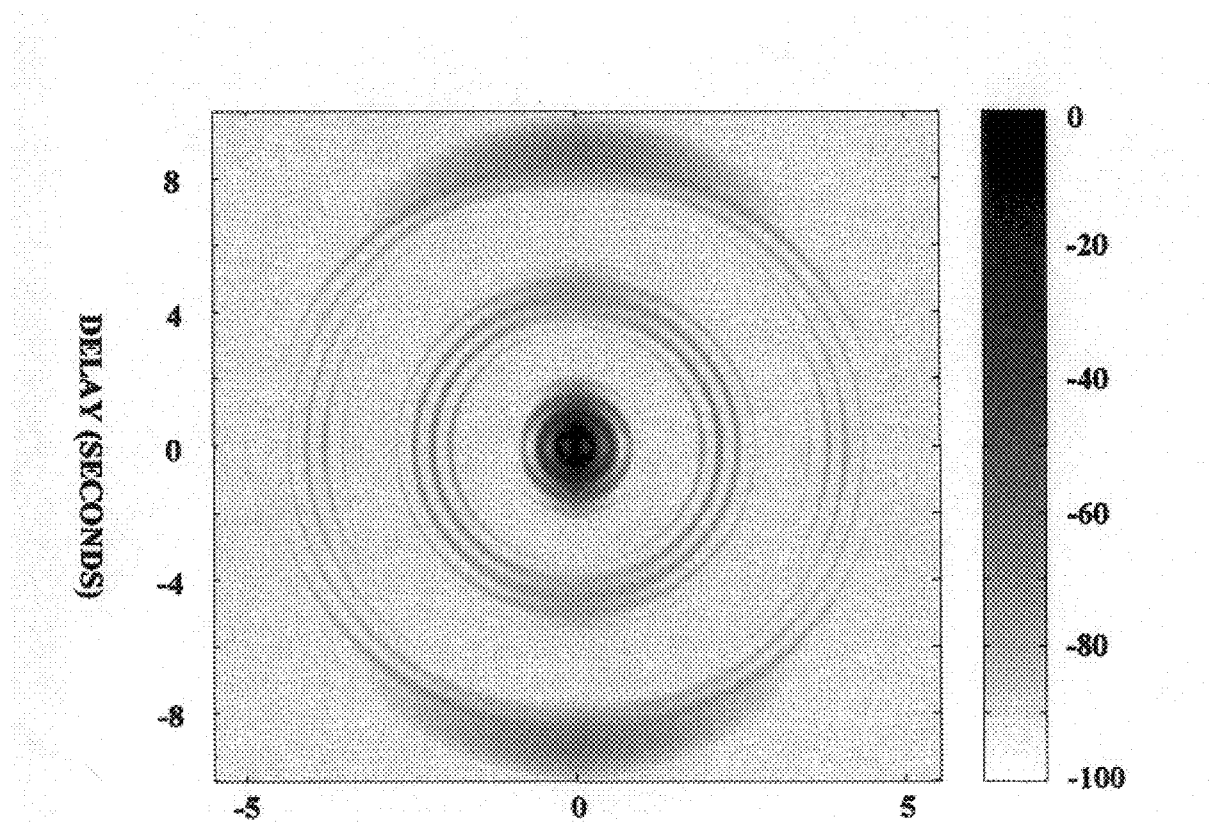
FIG. 8 shows the (full 2D) sidelobe-reduced AF associated with the exemplary HFS waveform from FIGS. 4(a)–(b), which is derived from the 1D slices of FIG. 7 using the processing methods of this invention.

Once a dense selection (for example, 24 values of q) of these radial slices is available, the points can be interpolated into a rectangular raster V with sampling intervals commensurate with the original AF (U). An example of such an enhanced AF (V) is shown in FIG. 8. This procedure is an approximation to the full deconvolution obtained using the more complicated methods described in the above-cited Abbiss et al. reference.

Performance in Reverberation

Figure 9:
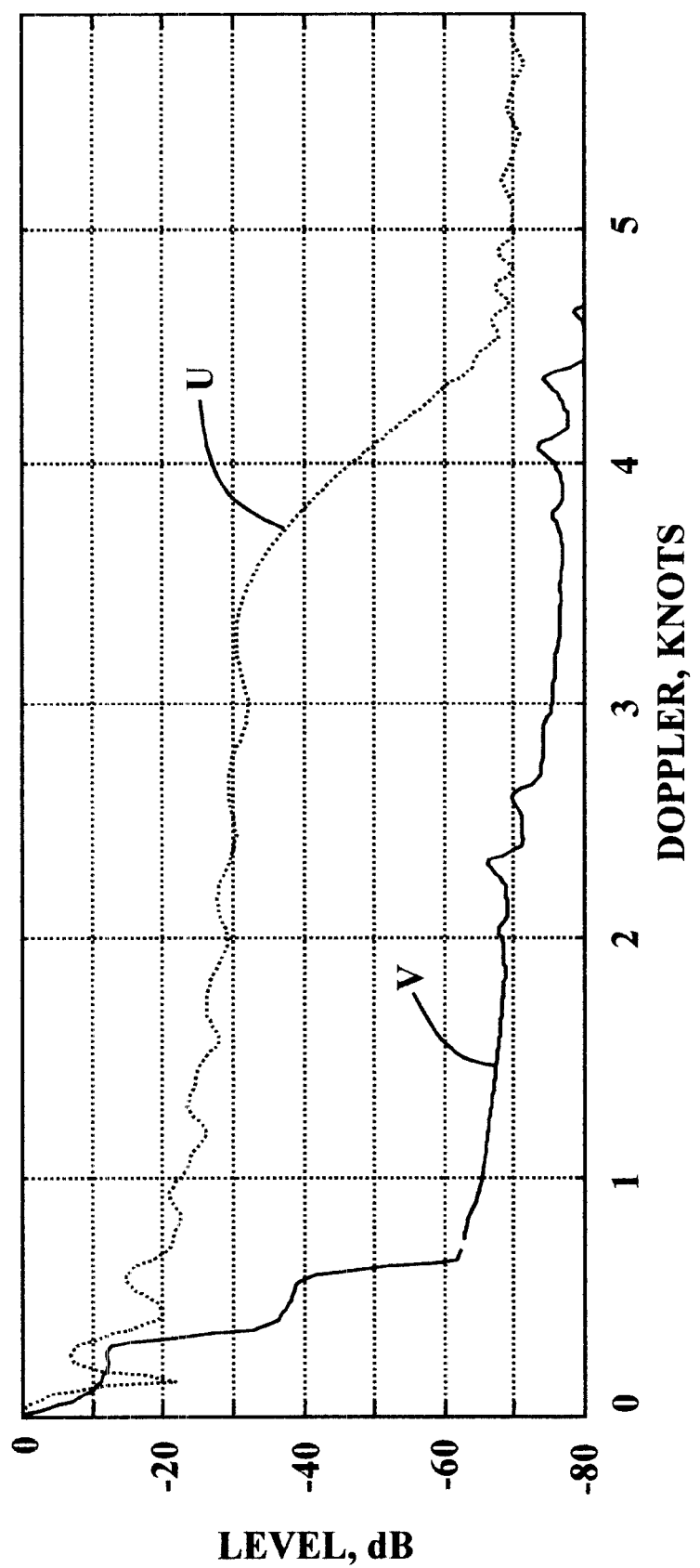
FIG. 9 shows a comparison of the Q-functions for the conventionally-processed and improve-processed exemplary HFS waveform from FIGS. 4(a)–(b), revealing the superior Doppler sensitivity of the waveform/processing combination of this invention.

The Doppler sensitivity of the processing-enhanced waveform AF (V) maybe compared with that of the original waveform AF (U) through computing the respective Q-functions, for which reference is made to the above-cited G. W. Delay reference. FIG. 9 illustrates the results of doing this for the above HFS comb waveform example. This is an estimation based on one-dimensional deconvolution slices. More precise results may be obtained by using full 2D processing but the results in FIG. 9 strongly indicate that substantial improvement in the Q-function is available from the processing method of this invention, proving that the HFS comb waveform of this invention is a new strong candidate for Doppler-sensitive sonar operations in reverberation-limited conditions.

From the above teachings, it maybe readily appreciated that the HFS comb waveforms of this invention are Doppler-sensitive waveforms useful for active sonar systems where some modest range resolution is also required or desired, and relatively-efficient power usage is needed. The full Doppler sensitivity normally associated with pulsed CW (or better) can be realized by the application to HFS signals of the constrained, regularized deconvolution processing method of this invention described above.

From the above teachings, is maybe readily appreciated that the deconvolutionally-processed HFS comb waveform offers better reverberation-limited performance than does the triplet-pair comb waveform or any of its predecessors, while maintaining a noise-limited performance equal to the best of these.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. An acoustic detection method comprising the steps of:
   transmitting an acoustic signal employing a Hermite function space (HFS) comb waveform to ensonify a target area;
   detecting acoustic reflections from the target area at a receiver transducer;
   generating a transducer output signal representing the acoustic reflections; and
   processing the transducer output signal to determine range and Doppler values for the target area.

2. The method of claim 1 wherein the HFS comb waveform has a bandwidth W and a center frequency $f_c$ and a pulse period T and includes one or more ($N \geq 0$) pairs of modulated delayed spectral components defined by:
   choosing a plurality 2*N of spectral components where N is a positive integer;
   modulating each of the spectral components with a different Hermite function selected from the set $\{h_k\}$ where $$h_k = C_{k-1}\left(\frac{1}{\sqrt{T}}\right)H_{k-1}(x)e^{-\pi(\frac{t}{T})^2}, \quad x = t\sqrt{\frac{2\pi}{T}},$$

$H_k(x)$=the $k^{th}$ Hermite polynomial, and $$C_k = \frac{2}{\sqrt{k!2^k}}$$

for k=1, 2, 3, ..., N; and
   selecting the modulated spectral component having the longest duration; and
   delaying each of the other modulated spectral components with respect to the longest modulated spectral component by a different delay selected from a set of predetermined time delays.

3. The method of claim 2 further comprising the step of:
   processing the transducer output signal to obtain a constrained, regularized deconvolution signal representing the range and Doppler values for the target area, whereby the autocorrelation function (AF) sidelobes are reduced and the low-Doppler sensitivity is increased.

4. The method of claim 1 further comprising the step of:
   processing the transducer output signal to obtain a constrained, regularized deconvolution signal representing the range and Doppler values for the target area, whereby the autocorrelation function (AF) sidelobes are reduced and the low-Doppler sensitivity is increased.

5. An acoustic detection apparatus comprising:
   an acoustic transmitter for transmitting an acoustic signal to ensonify a target area, wherein the acoustic signal includes a Hermite function space (HFS) comb waveform;
   a receiver transducer for detecting acoustic reflections from the target area;
   a circuit for generating a transducer output signal representing the acoustic reflections; and
   a signal processor for processing the transducer output signal to determine range and Doppler values for the target area.

6. The apparatus of claim 5 further comprising:
   a waveform generator for producing the HFS comb waveform with a bandwidth W and a center frequency $f_c$ and a pulse duration T and includes one or more ($N \geq 0$) pairs of modulated delayed spectral components defined by:
   choosing a plurality 2*N of spectral components where N is a positive integer;
   modulating each of the spectral components with a different Hermite function selected from the set $\{h_k\}$ where $$h_k = C_{k-1}\left(\frac{1}{\sqrt{T}}\right)H_{k-1}(x)e^{-\pi(\frac{t}{T})^2}, \quad x = t\sqrt{\frac{2\pi}{T}},$$

$H_k(x)$=the $k^{th}$ Hermite polynomial, and $$C_k = \frac{2}{\sqrt{k!2^k}}$$

for k=1, 2, 3, ..., N;
   selecting the modulated spectral component having the longest duration; and
   delaying each of the other modulated spectral components with respect to the longest modulated spectral component by a different delay selected from a set of predetermined time delays.

7. The apparatus of claim 6 further comprising:
   a waveform processor for processing the transducer output signal to obtain a constrained, regularized deconvolution signal representing the range and Doppler values for the target area, whereby the autocorrelation function (AF) sidelobes are reduced and the low-Doppler sensitivity is increased.

8. The apparatus of claim 5 further comprising:
   a waveform processor for processing the transducer output signal to obtain a constrained, regularized deconvolution signal representing the range and Doppler values for the target area, whereby the autocorrelation function (AF) sidelobes are reduced and the low-Doppler sensitivity is increased.

* * * * *